United States Patent [19]
Hall et al.

[11] Patent Number: 5,362,539
[45] Date of Patent: Nov. 8, 1994

[54] MINERAL FIBER INSULATION ASSEMBLY

[75] Inventors: Herbert L. Hall, Newark; Clarke Berdan, II, Granville; James W. Scott, Newark; Steven H. Williams, Alexandria; Jean E. Schelhorn, Granville, all of Ohio

[73] Assignee: Owens-Corning Fiberglas Technology Inc., Summit, Ill.

[21] Appl. No.: 998,692

[22] Filed: Dec. 30, 1992

[51] Int. Cl.⁵ .......................... E04B 2/00; B32B 1/04
[52] U.S. Cl. ..................................... 428/68; 428/34.6; 428/34.5; 428/34.7; 428/131; 428/136; 428/137; 428/221; 428/224; 428/69; 428/74; 52/408
[58] Field of Search ................. 52/407, 408; 428/137, 428/34.6, 34.5, 34.7, 131, 136, 221, 224, 68, 6.9, 74

[56] References Cited

U.S. PATENT DOCUMENTS

| | | |
|---|---|---|
| 2,330,941 | 10/1942 | Acuff, Jr. et al. |
| 2,495,636 | 1/1950 | Hoeltzel et al. |
| 2,579,036 | 12/1951 | Edelman |
| 4,696,138 | 9/1987 | Bullock ................................ 52/407 |
| 5,318,644 | 6/1994 | McBride et al. ................... 156/62.2 |

FOREIGN PATENT DOCUMENTS

| | | |
|---|---|---|
| 5508 | 2/1972 | Japan |
| 21515 | 4/1974 | Japan |
| 143156 | 6/1978 | Japan |
| 84657 | 8/1979 | Japan |
| 51382 | 10/1980 | Japan |

OTHER PUBLICATIONS

"Fiberglas Building Insulation In Residential Construction" Owens-Corning Fiberglas Corp. brochure, Fiberglas Standards A8.2.1.
"Criterion for the appearance of natural convection in an anisotropic porous layer" by J. F. Epherre, International Chemical Engineering (vol. 17, No. 4) Oct. 1977, pp. 615–616.
"Natural Convection in Enclosed Porous Media With Rectangular Boundaries" by B. K. C. Chan et al., Journal of Heat Transfer, Feb. 1970, pp. 21–27.
"Thermal Performance of the Exterior Envelopes of Buildings II", Proceedings of the ASHRAE/DOE Conference, Dec. 6–9, 1982.
"Thermal Performance of Residential Attic Insulation", by Kenneth E. Wilkes et al., Energy and Buildings 5 (1983) pp. 263–277.
"Thermo-Brite ® Radiant Barrier", PARSEC Product Bulletin 200-1, Jun. 1984, PARSEC, Inc.
"Hydrothermal Convection in Saturated Porous Media", by M. A. Combarnous et al., Groupe d'Etude I.F.P.–I.M.F. sur les Milieux Pareux, Toulouse, France 1971, pp. 231–307.
"Natural Convection in Vertical Permeable Space":, by Claes G. Bankvall, Warme- und Stoffubertragung 7 (1974) No. 1.
"The Properties And Processing Of 'TYVEK' Spunbonded Olefin", DuPont Technical Information Manual for TYVEK, 1978.

(List continued on next page.)

*Primary Examiner*—Patrick J. Ryan
*Assistant Examiner*—Richard C. Weisberger
*Attorney, Agent, or Firm*—Ted C. Gillespie; Patrick P. Pacella

[57] ABSTRACT

A mineral fiber insulation assembly is disclosed. The insulation assembly includes a longitudinally extending mineral fiber core having opposed major surfaces, opposed side surfaces and opposed end surfaces. A low friction polymer film is positioned adjacent the major surfaces and the side surfaces. At least one of the side surfaces is attached to the polymer film. A plurality of openings are provided in the polymer film adjacent at least one of the side surfaces. The insulation assembly is readily compressible and expandable at the job site. The low friction film provides easy installation.

20 Claims, 2 Drawing Sheets

OTHER PUBLICATIONS

"Stop energy-robbing air infiltration in your buildings with barrier sheeting of TYVEK", DuPont brochure.

"Lessons From A Mock Attic", By Nancy Armistead, Popular Science, Dec. 1992.

"Thermal Performance of One Loose-Fill Fiberglass Attic Insulation", by Kenneth E. Wilkes, Insulation Materials: Testing and Applications, 2nd vol., ASTM STP 1116.

"Evaluation of Attic Seal Products Applied To Loose-Fill Fiberglass Insulation In A Simulated Residential Attic-Phases I and II", by K. E. Wilkes et al., Oak Ridge National Laboratory, Letter Report ORNL-/M-1644.

"R-19 Insulation Only", picture of product cover, Nov. 18, 1982, Owens-Corning Fiberglas Corp.

"Directions for Applying Building Insulation", brochure, Owens-Corning Fiberglas Corp.

MINERAL FIBER INSULATION ASSEMBLY

BACKGROUND OF THE INVENTION

The invention relates to a mineral fiber insulation assembly which is used to insulate, for examples, floors, attics, ceilings and walls of buildings. It is well known in the art to insulate buildings using various types of mineral fiber insulating materials such as fibrous glass wool.

In the manufacture of mineral fiber insulation assemblies, it is a commonly-used practice to fiberize the mineral fibers from molten mineral material and distribute the fibers on a collecting conveyor to form a pack. After formation, the pack is cut into desired lengths or batts. Often, the lengths of material are rolled and tightly compressed for packaging and transport.

In some cases a facing material is added to the pack prior to the cutting step.

In U.S. Pat. No. 4,696,138 a film is provided in association with the insulating batts.

One of the uses of insulation assemblies is to reinsulate the attic spaces of residential dwellings. Often, reinsulation batts are unfaced in order to avoid introducing a new vapor barrier within the insulation layers within the space. When unfaced batts are utilized, it is difficult to slide the new batts into place. Furthermore, the unlined batts have a tendency to delaminate if the friction forces are too great.

On the other hand, if an unfaced batt is utilized to insulate the spaces between vertical studs, the friction of the unlined surfaces provides an advantage in that the friction forces between the unlined batt and the wooden studs hold the bart in place. Again, however, if the forces are too great, there is a tendency to delaminate. The present mineral fiber insulation assembly is directed to a faced mineral fiber core which allows the installer to readily slide the insulation assembly into place and at the same time provide sufficient friction to allow the assembly to be installed between vertical studs. The faced insulation assembly is also readily compressible for shipment and readily expandable in the field. In addition, the facing associated with the mineral fiber core contains dust associated with the batts as they are used for insulation or reinsulation.

A mineral fiber insulation assembly must be nonflammable in that it must pass the requisite ASTM flame spread test. The present insulation assembly provides the requisite product which passes the ASTM test. In addition, the present insulation assembly is sufficiently porous, so that it does not become a vapor barrier during reinsulation.

SUMMARY OF THE INVENTION

The present invention relates to a mineral fiber insulation assembly which is readily compressible and expandable for insulation both in original construction and also in remodeling or other reinsulation.

The mineral fiber insulation assembly includes a longitudinally extending mineral fiber core having opposed major surfaces, opposed side surfaces and opposed end surfaces. A low friction polymer film is positioned adjacent the opposed major surfaces and adjacent the opposed side surfaces. No film is positioned adjacent the end surfaces. At least one of the side surfaces is attached to the polymer film. A plurality of side openings are provided in the polymer film adjacent at least one of the side surfaces. The openings facilitate the compression of the completed insulation assembly for shipment and the expansion of the insulation assembly at the job site.

DESCRIPTION OF THE PREFERRED EMBODIMENTS

Figure 1:
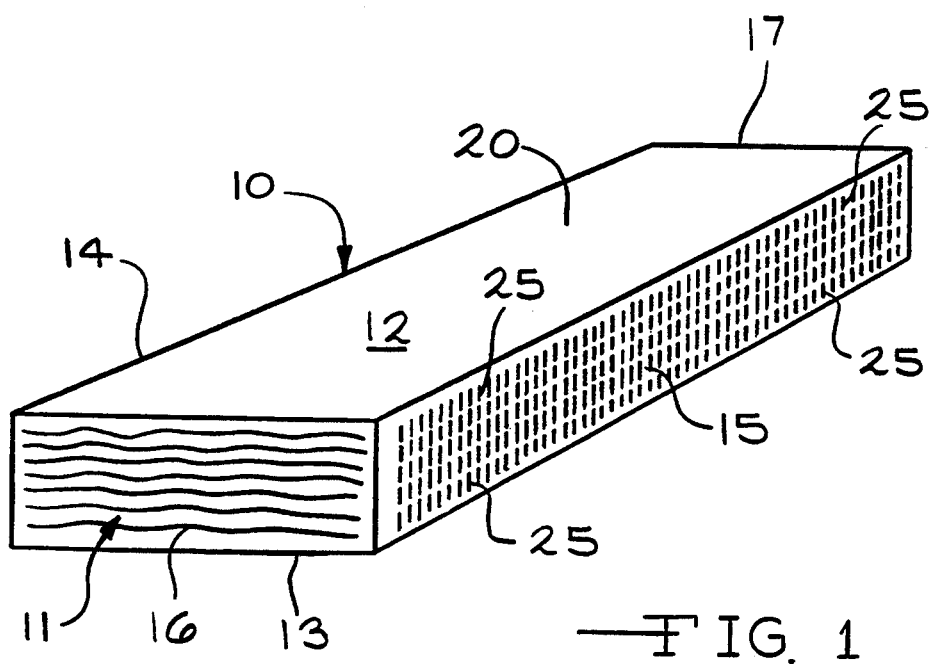
FIG. 1 is a perspective view of an insulation assembly, according to the present invention.

Referring to FIG. 1, the insulation assembly, according to the present invention, is generally indicated by the reference number 10. The insulation assembly 10 includes a longitudinally extending mineral fiber core 11. Preferably, the mineral fiber core is constructed of fibrous glass wool having a density of about 0.7 pounds per cubic foot. The core 11 includes opposed major surfaces 12 and 13 which, in the present embodiment, comprise the upper and lower surfaces of the insulation assembly 10. The core 11 also includes opposed side surfaces 14 and 15 and opposed end surfaces 16 and 17. Normally the fibrous glass core would have a thickness of approximately 4 inches (10.16 cm.) to 8 inches (20.32 cm). Preferably, the thickness is greater than 4 inches (10.16 cm.). If used for attic insulation, the insulation assembly 10 should be in the 8 inch (20.32 cm.) range.

A low friction polymer film 20 is positioned adjacent the opposed major surfaces 12 and 13 and the side surfaces 14 and 15. The end surfaces 16 and 17 are not covered with the polymer film 20. The polymer film 20 is suitable to contain dust or other contaminates within the insulation assembly 10 and also to provide a low kinetic friction surface. The polymer film 20 is preferably a polyethylene film. One type of polyethylene film which is particularly desirable is a high molecular weight, high density, polyethylene film. Other polymer films which may be used are polypropylene films. One preferred polypropylene film is a biaxially oriented polypropylene film.

The polymer film 20 is less than or equal to 1.0 rail in thickness. Preferably the polymer film is less than or equal to 0.5 rail. in thickness.

Figure 2:
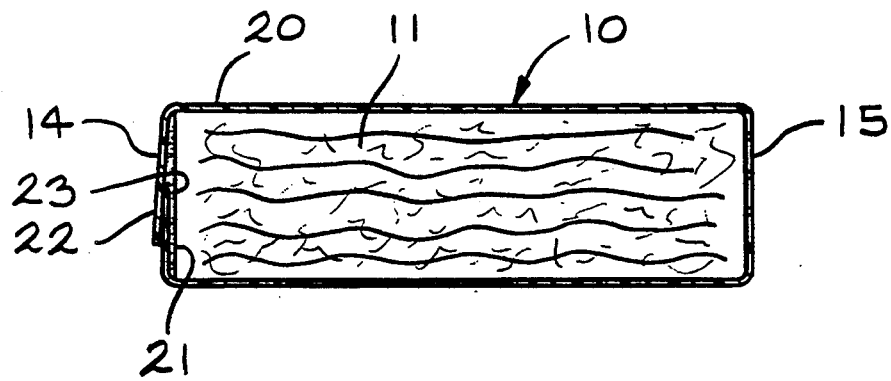
FIG. 2 is a cross-sectional view of the mineral fiber insulation assembly shown in FIG. 1.

The polymer film 20 is attached to at least one of the side surfaces 14 and 15 of the core 11. Referring to FIG. 2, the polymer film 20 is attached to the core 11 by an adhesive 21. One adhesive which is suitable is a pressure sensitive adhesive, such as HM-2707 distributed by H.B. Fuller Company. This adhesive is applied at a rate of 0.2 grams per square foot.

However, other types of attaching or fastening means may be utilized to attach one or both of the side surfaces 14 and 15 to the polymer film 20. These include heat sealing the polymer film 20 to the core 11 or the use of fasteners such as VELCRO fasteners. The attaching of the polymer film 20 to the side surfaces 14 and 15 must be sufficient to prevent relative movement between the polymer film 20 and the core 11.

Referring to FIGS. 1 and 2, in the insulation assembly 10, the polymer film includes side edges 22 and 23 which overlap and are also adhered to one another.

In the FIG. 1-2 embodiment, a plurality of openings 25 are provided in the polymer film 20 adjacent the side surface 15. The openings or slits 25 provide for the entrance and escape of ambient air to and from the core 11. After manufacture, the insulation assembly 10 is rolled and compressed for shipment to the job site. When this occurs the openings or slits 25 have a generally diamond configuration. At the job site, when the insulation assembly 10 is unrolled, air returns through the openings 25 to the core 11. The insulation assembly 10 preferably has a 6 to 1 compression ratio.

Preferably the polymer film 20, adjacent the major surfaces 12 and 13, is also a vapor permeable film so that a vapor barrier does not result during reinsulation work.

The openings 25 in the polymer film 20 adjacent the side surface 15 defines an open area of preferably at least 4% of the total area of the side surface 15 and preferably no more than 50% of the total area of the side surface 15. More Preferably, the openings 25 in the film 20 provide or define an open area of between 6% and 10% of the area of the side surface 15.

As best shown in FIG. 2, the insulation assembly 10 includes a generally "C" shaped one-piece polymer film 20.

Figure 5:
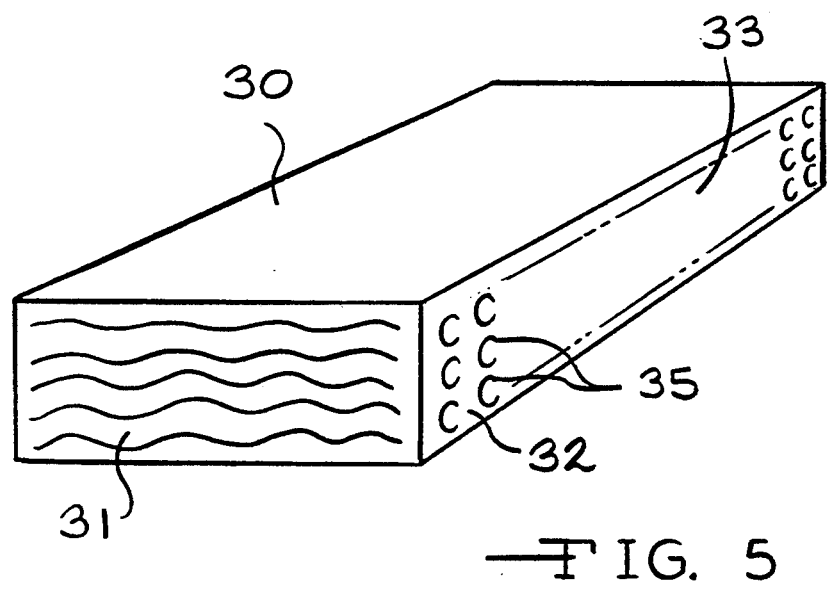

Other shapes of openings may be utilized rather than the slit openings 25, shown in FIG. 1. Referring to FIG. 5, an insulation assembly 30, according to the present invention, includes a core 31 having a side surface 32. A polymer film 33 encapsulates the mineral wool core 31 and is adhered to the side surface 32. The polymer film 33 adjacent the side surface 32 defines a plurality of openings 35 having a "C" or reversed "C" configuration. Preferably the open side of the "C" should be positioned so that the flap formed by the "C" opening does not become entangled during the manufacture of the insulation assembly 30. Therefore, if "C" shaped openings 35 are provided in the polymer film 33 adjacent the side surface 32, normally reversed "C" shaped openings would be provided in the film 33 adjacent the opposed side surface. The flaps which result provide the required air openings and also are useful in the installation of the insulation assemblies 30. When the insulation assemblies 30 are positioned, for example, between vertical studs, the flaps frictionally engage the vertical surfaces of the studs and hold the insulation assemblies 30 in place, rather than sliding downwardly.

The plurality of openings 35 in the polymer film 33 define an open area of between 6% and 10% of the total area of the side surface 32 of the core 31.

Figure 3:
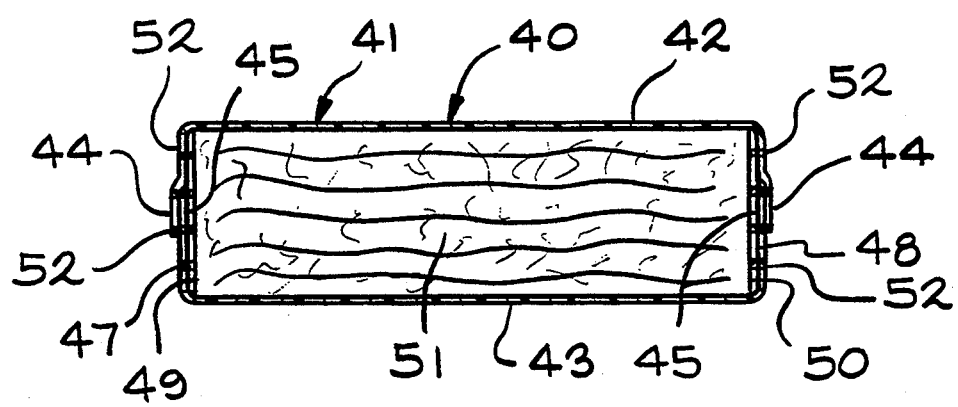
FIG. 3 is a cross-sectional view similar to FIG. 2, showing another embodiment of the present invention.

Referring to FIG. 3, another embodiment of an insulation assembly according to the present invention is generally indicated by the reference number 40. The insulation assembly 40 is similar to the insulation assembly 10, with the exception that the insulation assembly 40 includes a two-piece polymer film assembly 41 which includes an upper polymer film piece 42 and lower polymer film piece 43. The upper polymer film piece 42 includes side edges 44 which overlie and are attached to side edges 45 of the lower polymer film piece 43. In the present embodiment, adhesive layers 47 and 48 attach the upper and lower polymer film pieces 42 and 43 to side surfaces 49 and 50 of a core 51 of the insulation assembly 40. Openings or slits 52 are provided in the upper and lower polymer film pieces 42 and 43 adjacent both the side surfaces 49 and 50 of the core 51. In the insulation assembly 40, the polymer film assembly 41 comprising the upper and lower film pieces 42 and 43 is preferably permeable to allow the passage of water vapor.

Figure 4:
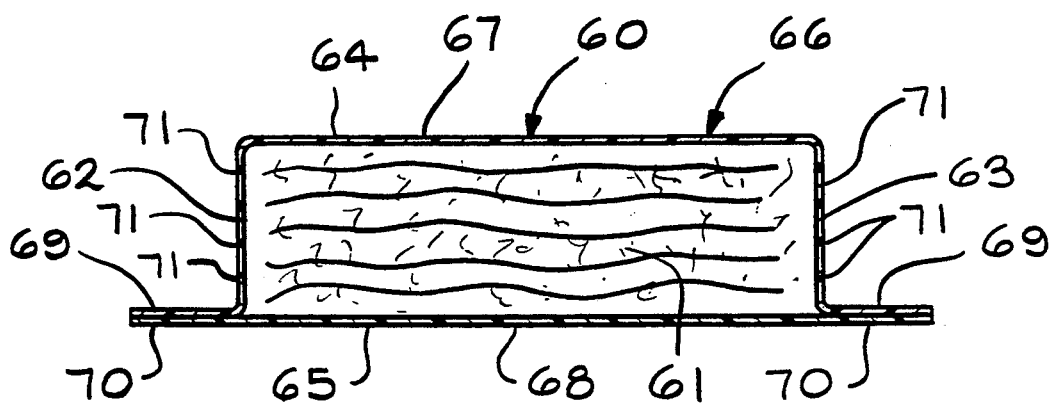
FIG. 4 is a cross-sectional view similar to FIG. 2, showing still another embodiment of the present invention; and, FIG. 5 is perspective view of still another embodiment of the present invention showing a different configuration of openings in a side surface.

Referring to FIG. 4, another embodiment of an insulation assembly according to the present invention is generally indicated by the reference number 60. The insulation assembly 60 includes a core 61 having side surfaces 62 and 63. The insulation assembly 60 is generally similar to the insulation assembly 10. The core 61 also includes an upper major surface 64 and a lower major surface 65. A polymer film assembly 66 is positioned adjacent the side surfaces 62 and 63 and the major surfaces 64 and 65. The polymer film assembly 66 includes an upper polymer film piece 67 and a lower polymer film piece 68. In the present embodiment, the upper polymer film piece 67 is attached to the side surfaces 62 and 63 by heat sealing the polymer film piece 67 to the core 61. The upper film piece 67 and the lower film piece 68 define mating flanges 69 and 70 which extend outwardly from the core 61. The flanges 69 and 70 are attached to one another and are normally used when the insulation assembly 60 is installed between building studs. Normally, the lower polymer film piece 68 is also attached by adhesive or by heat sealing to the lower major surface 65 of the core 61.

The upper polymer film piece 67 defines a plurality of slots 71 adjacent the side surfaces 62 and 63 of the core 61. Ambient air escapes through the slots 71 during compression and returns through the slots 71 during expansion.

Many revisions may be made to the above described embodiments without departing from the scope of the present invention or from the following claims.

We claim:

1. A mineral fiber insulation assembly comprising, in combination, a longitudinally extending mineral fiber core having opposed major surfaces, opposed side surfaces and opposed end surfaces, a low friction polymer film positioned adjacent said opposed major surfaces and said opposed side surfaces, at least one of said side surfaces being attached to said polymer film and a plurality of openings in said polymer film adjacent at least one of said side surfaces.

2. A mineral fiber insulation assembly, according to claim 1, wherein said polymer film is a polyethylene film.

3. A mineral fiber insulation assembly, according to claim 1, wherein said mineral fibers comprise glass fibers.

4. A mineral fiber insulation assembly, according to claim 1, wherein said plurality of openings comprise a plurality of vertical slits.

5. A mineral fiber insulation assembly, according to claim 1, wherein the thickness of said mineral fiber core is between 4 inches (10.16 cm.) and 8 inches (20.32 cm.).

6. A mineral fiber insulation assembly, according to claim 1, wherein said plurality of openings comprise a plurality of "C" shaped or reversed "C" shaped openings.

7. A mineral fiber insulation assembly, according to claim 1, wherein said plurality of openings define an open area of at least four percent of the area of said side surface and no more than fifty percent of the area of said side surface.

8. A mineral fiber insulation assembly, according to claim 5, wherein said plurality of openings define an open area of between six percent and ten percent of the area of said side surface.

9. A mineral fiber insulation assembly, according to claim 1, wherein said polymer film is attached to at least one of said side surfaces.

10. A mineral fiber insulation assembly, according to claim 7, wherein said polymer film is attached to both of said opposed side surfaces.

11. A mineral fiber insulation assembly, according to claim 7, including a layer of adhesive positioned between said polymer film and said side surface.

12. A mineral fiber insulation assembly according to claim 1, wherein said polymer film has a thickness of less than one rail.

13. A mineral fiber insulation assembly according to claim 10, wherein film thickness is less than 0.5 rail.

14. A mineral fiber insulation assembly comprising, in combination, a longitudinally extending glass fiber core having opposed major surfaces, opposed side surfaces and opposed end surfaces, a low friction polymer film positioned adjacent said opposed major surfaces and said opposed side surfaces, said film having a thickness of one rail or less, at least one of said side surfaces being attached to said polymer film and a plurality of openings in said polymer film adjacent at least one of said side surfaces, said plurality of openings defining an open area of between six percent and ten percent of the area of said side surface.

15. A mineral fiber insulation assembly, according to claim 14, wherein said glass fiber core has a thickness greater than 4 inches (10.16 cm.).

16. A mineral fiber insulation assembly, according to claim 14, wherein said plurality of openings comprise a plurality of "C" shaped or reversed "C" shaped openings.

17. A mineral fiber insulation assembly comprising in combination, a longitudinally extending mineral fiber core having opposed major surfaces, opposed side surfaces and opposed end surfaces, a low friction polymer film positioned adjacent said opposed major surfaces and said opposed side surfaces, at least one of said side surfaces being attached to said polymer film and a plurality of openings in said polymer film adjacent both of said side surfaces, wherein said plurality of openings desine an open area of at least four percent of the area of said side surface and no more than fifty percent of the area of said side surface.

18. A mineral fiber insulation assembly according to claim 17, including a layer of adhesive positioned between the film and one of said side surfaces.

19. A mineral fiber insulation assembly, according to claim 17, wherein said plurlaity of openings define an open area of between six percent and ten percent of the area of said side surface.

20. A mineral fiber insulation assembly, according to claim 17, wherein said plurality of openings comprise a plurality of "C" shaped or reversed "C" shaped openings.

* * * * *